April 24, 1962 R. F. DIEDERICH ETAL 3,030,825
DIFFERENTIAL
Filed April 24, 1959
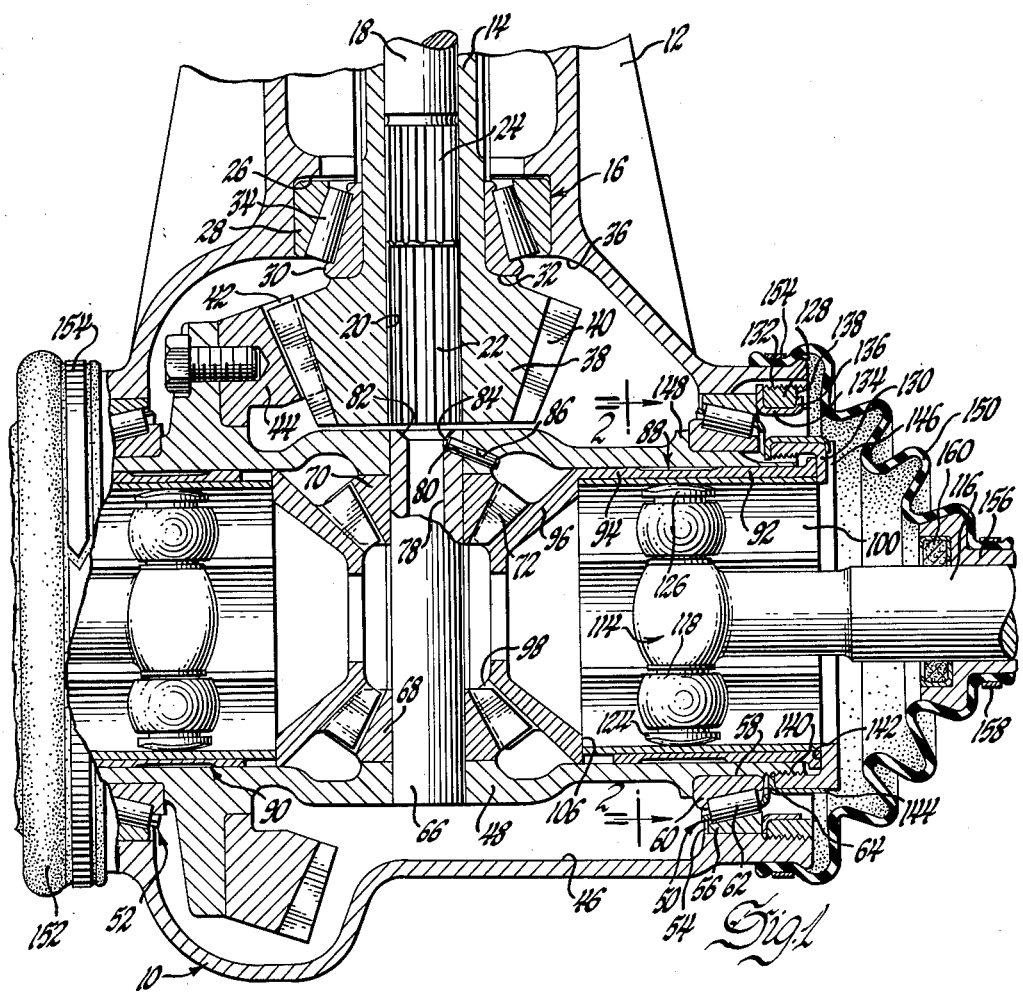
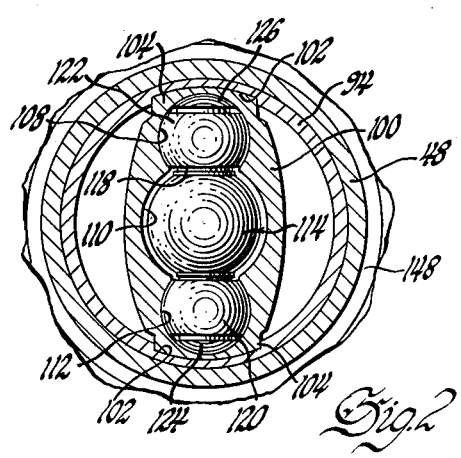
INVENTORS
Robert F. Diederich,
Charles N. McCarthy, &
BY George Smaga
ATTORNEY

United States Patent Office 3,030,825
Patented Apr. 24, 1962

3,030,825
DIFFERENTIAL
Robert F. Diederich and Charles N. McCarthy, Royal Oak, and George Smaga, Detroit, Mich., assignors to General Motors Corporation, Detroit, Mich., a corporation of Delaware
Filed Apr. 24, 1959, Ser. No. 808,679
3 Claims. (Cl. 74—713)

This invention relates to differential units, and more particularly to the type of differential unit that would be used in a motor vehicle rear axle having a suspension in which the axle shafts are connected to the differential unit through a universal joint.

In a differential unit, and particularly in the type used with a De Dion type rear suspension, there has been a great deal of difficulty in providing an economical and compact differential assembly suitable for volume production usages. The major problem involved in most differential units is in the assembly of the differential side gears and the joint connecting the side gears with the axle shafts. A universal joint is generally employed and it is easily seen that assembling all the necessary parts in a compact differential housing is extremely difficult.

A second problem arising in the generally available differential unit is in the takeup of gear back-lash and manufacturing tolerances in the differential and side gears. Various complicated and complex methods have been provided in the past in order to take up gear lash and tolerances, resulting in expensive differential units that are out of the question for volume production manufacture.

The device in which this invention is embodied comprises generally a differential housing, a carrier rotatably secured in the housing and pot type universal joints receiving the axle shafts and, at the same time, acting as the differential side gears. Retaining rings are provided to secure the universal joint housing in the carrier in an adjustable manner to take up gear lash and tolerances and to secure the universal joint housing in the carrier.

A structure of this type provides a simple and economic construction for a differential assembly, relatively inexpensive in cost and suitable to production machining and assembly methods. A motor vehicle manufacturer is thus able to produce a differential unit for a De Dion type suspension on a competitive basis with the usual differential unit, thus obtaining the benefits of the De Dion type suspension at a reasonable cost.

In the drawings:

FIGURE 1 is a plan view, with parts broken away and in section, of the differential unit assembly embodying this invention.

FIGURE 2 is a cross-sectional view of a portion of the differential unit of FIGURE 1 to illustrate the pot type universal joint and taken along the line 2—2 of FIGURE 1.

Referring more particularly to the drawings, a differential housing 10 is shown which contains the remainder of the differential assembly. The differential housing may be formed from a casting, or the like, and has a neck 12 extending therefrom in the direction of the motor vehicle drive shaft. A drive pinion 14 is supported by bearings, illustrated generally by the numeral 16, received in the neck 12, and the pinion is connected to the vehicle drive shaft 18.

The differential pinion shaft 14 has an axial bore 20 formed therethrough and an internal spline 22 in the axial bore. The drive shaft 18 has a cooperating external spline 24 formed on the end thereof and is received in the bore 20 of the pinion shaft 14, such that rotation of the drive shaft 18 will rotate the pinion shaft 14. The housing neck 12 has an annular opening 26 formed therein to receive the outer race 28 of the bearing assembly 16. The inner race 30 abuts a shoulder 32, formed on the pinion 14, and a plurality of tapered roller bearings 34 separate the inner and outer races 30 and 28 and provide relatively frictionless rotation of the pinion 14 in the neck 12. A second bearing assembly, similar to bearing assembly 16, may be provided toward the outer end of the neck 12 for proper support of the pinion 14.

Within the housing 10 is a chamber 36 which receives an enlarged end portion 38 of the pinion shaft 14. A plurality of gear teeth 40 are formed on the enlargement 38 and engage a plurality of teeth 42 formed on a ring gear 44 within the housing. It may be seen that when the drive shaft 18 rotates the pinion shaft 14, through the spline connection, that the teeth 40 of the pinion shaft act on the teeth 42 of the ring gear 44 and rotate the ring gear.

The large chamber 46, formed within the housing 10, contains the remainder of the differential assembly. A carrier 48 is supported by bearings, illustrated generally by the numerals 50 and 52, within the housing 10 for relatively frictionless rotation of the carrier with respect to housing. An annular groove 54 in the interior of the housing 10 receives the outer race 56 of the bearing assembly 50. An annular groove 58 formed on the carrier 48 receives the inner race 60 of the bearing assembly 50. A plurality of tapered roller bearings 62 and a bearing cage 64, received between the inner and outer races, provide the relatively frictionless rotation. A similar configuration is provided for the bearing assembly 52.

A shaft 66 extends transversely of the carrier 48 and has secured thereto a pair of differential gears 68 and 70. The gears have the teeth 72 formed therefrom to mesh with the side gears, which will be later described. The cross shaft 66 has an axial opening 78 formed completely therethrough and is retained in the carrier 48 by a plurality of pins 80. An internal chamfer 82 formed in the cross shaft with the opening 78, allows for the insertion of the pins 80 in the opening 84 in the cross shaft and a corresponding opening 86 in the carrier. The purpose of a hollow cross shaft is the amount of weight eliminated as compared to the standard solid cross shaft, as well as a means for inserting the pins 80.

Also secured in the carrier 48 are a pair of pot type universal joints, illustrated generally by the numerals 88 and 90, only one of which will be described. The universal joint housing, or pot, 92 has a cylindrical portion 94 received in the carrier 48, and a conical portion 96 on which are formed the gear teeth 98. The gear teeth 98 mesh with the gear teeth 72 formed on the differential gears 68 and 70, the conical portion 96 of the universal joint housing and the gear teeth 98 acting as a differential side gear. The cylindrical portion 94 is rotatably received in the carrier 48 and has a sleeve 100 secured in any suitable manner therein.

The sleeve 100 is best illustrated in FIGURE 2, where it is shown secured in the cylindrical portion 94 of the housing within the carrier 48. A pair of axial grooves 102 are provided in the cylindrical portion 94 of the housing to receive the cooperating extensions 104 of the sleeve 100 in a dovetail-like fitting. The connection is such that the sleeve may be inserted into the housing 94 in an axial direction and located therein by the shoulder 106 formed internally in the housing 92 at the junction between the cylindrical portion 94 and the conical portion 96. The sleeve 100 has three interconnecting axial bores 108, 110 and 112 to receive the trunnion and bearing assembly, illustrated generally by the numeral 114. The axle shaft 116 extends into the central bore 110 and has a trunnion shaft 118 secured transversely therethrough. The opposite ends of the trunnion shaft 118 extend into the bores 108 and 112 in the sleeve 100. Bearing sleeves 120 and 122 are placed on opposite ends of the trunnion shaft 118 about an annulus of needle bearings (not shown), and the bearing caps 124 and 126 aid in movement of the shaft 116 and the trunnion and bearing assembly 114 within the sleeve 100.

In order to secure the universal joint housing 92 and the bearing assemblies 50 and 52 in the carrier 48 and the housing 10, a pair of retaining rings 128 and 130 are provided. The retaining ring 128 abuts the outer race 56 of the bearing assembly 50 and is secured in the housing 10 by the threaded engagement 132. A tab washer 134 between the retaining ring 128 and the outer race 56, and having a tab 136 adapted to be bent into the opening 138 in the retaining ring, provides for locking engagement of the parts.

The retaining ring 130 is threadedly received, as at 140, on the carrier 48 and abuts the universal joint housing 92, as at 142. A second tab washer 144 may be bent into the opening 146 in the retaining ring 130 to locate the parts in position. It may also be seen that the retaining ring 130 abuts the inner race 60 of the bearing assembly 50, which in turn engages an annular shoulder 148 formed on the surface of the carrier 48. The universal joint housing and the bearing assembly are thus located and secured in the housing and carrier.

In order to seal the differential unit from dirt and foreign material a pair of boots 150 and 152 are provided, secured to the housing 10 by the retaining rings 154. The outboard ends of the boot members 150 and 152 are received on the bushings 156 and retained thereon by the retaining ring 158. The bushing 156 is slidable along the axle shaft 116 and a seal 160 prevents the entry of dirt or foreign material along the shaft itself.

In the normal operation of the differential unit, the drive shaft 18 rotates the pinion shaft 14 and the ring gear 44 through the engaging teeth 40 and 42. The ring gear and carrier assembly 44 and 48, and the cross shaft 66 and differential gears 68 and 70, rotate along with the ring gear 44, thus rotating the universal joint housings through the engaging gear teeth 72 and 98. Torque is transmitted to the axle shafts 116 and to the vehicle wheels (not shown).

Upon cornering or loss of traction at one wheel, it may be seen that differential action is provided by the universal joint housing 92 being rotatable with respect to the carrier 48 to lessen or increase the torque to one or the other of the wheels through the normal differential action of the differential gears 68 and 70.

The axle shafts 116 are provided relative axial movement and a limited amount of universal movement, by the universal joint assemblies 88 and 90.

The retaining ring 130 operates to position the bearing assemblies 50 and 52 relative to the housing 10 and the carrier 48 and also secure the universal joint pots 92 within the carrier 48. The retaining ring may be adjusted inwardly or outwardly relative to the carrier in order to take up gear back-lash between the side gears and the differential gears. Manufacturing tolerances are also taken up by the adjustment of the retaining ring 130 for better differential action.

Thus, a more economical differential unit is provided and one that is readily adaptable to production assembly manufacturing techniques, at a cost reasonably in accord with the usual type of differential unit.

What is claimed:

1. In a differential unit having a housing and a carrier rotatably disposed therein, a pair of universal joint housings secured against axial movement in said carrier and having gear teeth formed on the inner ends thereof, a cross shaft and differential gear assembly secured in said carrier and between said universal joint housings and engaging said gear teeth on said universal joint housings, and a retaining ring threadedly received on each end of said carrier and abutting said universal joint housings to retain said universal joint housings in said carrier and to allow axial adjustment of said universal joint housings to take up gear lash and tolerances in said differential unit.

2. A differential unit comprising a housing, a pinion shaft rotatably secured in said housing and extending therefrom, a pinion gear formed on the end of said pinion shaft within said housing, a carrier rotatably secured in said housing, a ring gear secured to said carrier and rotatable therewith, said ring gear engaging said pinion gear such that rotation of said pinion gear causes rotation of said ring gear, a pair of universal joint housings secured in said carrier and rotatable with respect thereto, a plurality of gear teeth formed on the inner ends of said universal joint housings, an axle shaft extending into each of said universal joint housings and having a trunnion and bearing assembly secured to the end thereof to provide rotation of said axle shafts when said universal joint housings are rotated, a cross shaft extending transversely through said carrier and between said universal joint housings, a pair of differential gears mounted on said cross shaft and engaging the gear teeth formed on said universal joint housings, and a retaining ring threadedly received on each end of said carrier and abutting said universal joint housings to retain said universal joint housings in said carrier and to provide axial adjustment thereof to take up gear lash and tolerances in said meshing gears.

3. In a universal joint having a housing and a carrier rotatably disposed therein, a shaft secured in said carrier and transversely thereof, a gear mounted on each end of said shaft, a pair of universal joint housings mounted in said carrier and at opposite ends thereof, a plurality of gear teeth formed on said universal joint housings and engaging said gears, bearing means disposed between said carrier and said housing and at opposite ends of said carrier, and retaining rings threadedly received on opposite ends of said carrier and abutting said bearing means and said universal joint housings to secure said bearing means thereon and to retain said universal joint housings therein and to provide axial adjustment of said universal joint housings to take up gear lash and tolerance differences in said gears and said universal joint housings.

References Cited in the file of this patent

UNITED STATES PATENTS

| 1,594,534 | Leister | Aug. 3, 1926 |
| 1,610,958 | Leister | Dec. 14, 1926 |
| 2,277,369 | Schultz et al. | Mar. 24, 1942 |

FOREIGN PATENTS

| 341,205 | Great Britain | Jan. 15, 1931 |
| 1,111,379 | France | Feb. 27, 1956 |